United States Patent [19]
Endoh

[11] Patent Number: 5,502,657
[45] Date of Patent: Mar. 26, 1996

[54] THREE-DIMENSIONAL MEASURING METHOD AND SYSTEM

[75] Inventor: Toshio Endoh, Kawasaki, Japan

[73] Assignee: Fujitsu Limited, Kawasaki, Japan

[21] Appl. No.: 2,385

[22] Filed: Jan. 11, 1993

[30] Foreign Application Priority Data

Jan. 10, 1992 [JP] Japan .................. 4-002537

[51] Int. Cl.⁶ .................................................. G01B 7/004
[52] U.S. Cl. .................... 369/561; 364/468; 364/559; 364/560; 364/516
[58] Field of Search .................... 364/468, 559, 364/560, 561, 516; 382/1, 22, 25; 356/376

[56] References Cited

U.S. PATENT DOCUMENTS

| | | | |
|---|---|---|---|
| 4,825,393 | 4/1989 | Nishiya | 364/516 |
| 4,853,970 | 8/1989 | Ott et al. | 382/22 |
| 4,896,364 | 1/1990 | Lohscheller | 382/22 |
| 4,982,438 | 1/1991 | Usami et al. | 382/25 |
| 5,063,524 | 11/1991 | Ferre et al. | 364/516 |
| 5,067,014 | 11/1991 | Bergen et al. | 364/516 |
| 5,068,908 | 11/1991 | Inoue et al. | 382/22 |
| 5,134,667 | 7/1992 | Suzuki | 382/22 |
| 5,144,373 | 9/1992 | Moler | 356/376 |
| 5,173,865 | 12/1992 | Koike et al. | 364/516 |
| 5,181,261 | 1/1993 | Nagao | 382/25 |
| 5,193,120 | 3/1993 | Gamache et al. | 356/376 |

*Primary Examiner*—Ellis B. Ramirez
*Assistant Examiner*—Hal P. Wachsman
*Attorney, Agent, or Firm*—Staas & Halsey

[57] ABSTRACT

A three-dimensional measuring method obtains three-dimensional information related to an image including one or a plurality of objects based on input information which describes the image. The method includes the steps of (a) selecting information necessary for calculating marks of presumed information from the input information, where each of the marks are used to evaluate the appropriateness of the presumed information, (b) calculating marks of each pixel of the image based on the information selected by the step (a) and based on feedback information which is derived from an internal state, where the internal state includes information related to the object for each pixel of the image, (c) adding the marks for each pixel calculated in the step (b) for each object so as to obtain a total mark, (d) arbitrarily changing the internal state so as to reduce the total mark, and (e) outputting the internal state in which the total mark is a local minimum as the three-dimensional information.

20 Claims, 6 Drawing Sheets

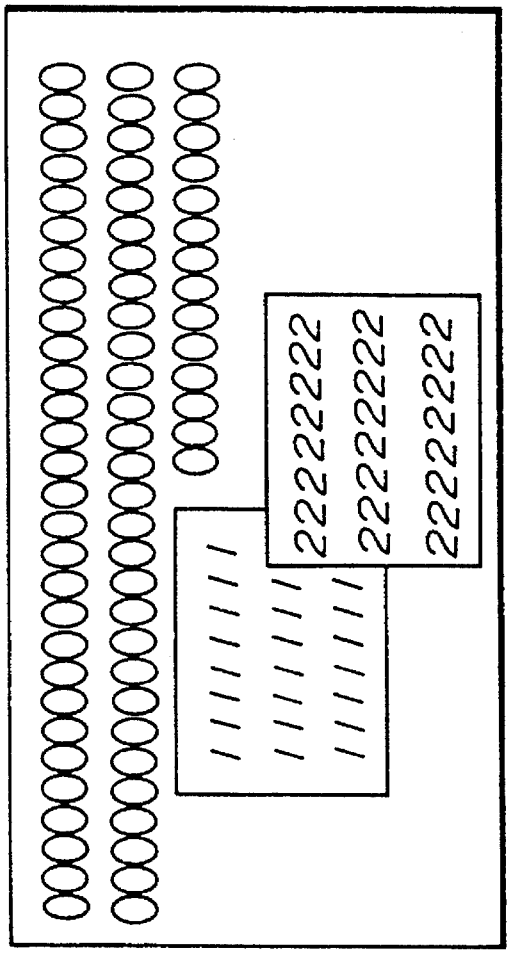
FIG. 2(a)
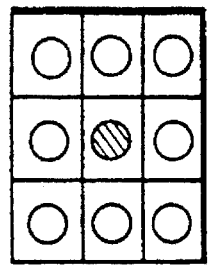
FIG. 2(c)
FIG. 2(b)
| OBJECT NO. | TRANS. MOTION | ROTATING MOTION |
|---|---|---|
| 1 | (0,0,1) | (2,3,2) |
| 2 | (1,0,0) | (1,0,0) |

THREE-DIMENSIONAL MEASURING METHOD AND SYSTEM

BACKGROUND OF THE INVENTION

The present invention generally relates to three-dimensional measuring methods and systems, and more particularly to a three-dimensional measuring method which makes a three-dimensional measurement based on an image which is picked and/or imaged up by a camera or the like and to a three-dimensional measuring system which employs such a three-dimensional measuring method.

It is particularly important in the field of factory automation that a measurement of three-dimensional information including depth information can be made by a robot or the like. This function is essential to proper operation of a robot eye when moving a robot arm of a robotic device to proper operation of a desired position, for example.

Conventionally, there are the following three methods (1)–(3) of making the three-dimensional measurement using a camera.

(1) A first method picks up the image by a range sensor which uses the fact that the reflection time of the ultrasonic wave becomes different depending on the distance.

(2) A second method picks up the image by two or more cameras, and uses the fact that the parallax becomes different between the picked up images depending on the distance.

(3) A third method picks up a moving image by an ordinary camera. For example, the moving image is made up of a predetermined number of still images which are picked up per second. A change between the two still images which are mutually time-adjacent, and the three-dimensional information are calculated based on the change.

The first method (1) is simple in that the depth information can be obtained directly. However, special equipment is required.

The second method (2) requires the positional relationship of the two or more cameras to be fixed. For this reason, it is difficult and troublesome to adjust the positions of the cameras.

The third method (3) calculates the three-dimensional information based on the assumption that only one body exists in the picked up image, that the brightness at each point on the body does not change with time, that and the brightness spatially changes smoothly. Based on these assumptions, the quantities which are to change between time-adjacent images are calculated by making the manner of the movement and the depth at each point on the image unknowns. Then, equations are solved by setting the calculated quantities equal to the observed changes, so as to calculate the manner of a body is movement and the depth at each point on the image.

This third method (3) has advantages in that the processing can be made using a single camera and that no difficult and troublesome adjustments are required in advance. However, the third method (3) can only be applied for the case where the image contains only one body (or object). In addition, because the information which is used relates to the moving image, there is a problem in that the accuracy of calculated three-dimensional information is not very good.

SUMMARY OF THE INVENTION

Accordingly, it is a general object of the present invention to provide a novel and useful three-dimensional measuring method and a system in which the above described problems are eliminated.

Another and more specific object of the present invention is to provide a three-dimensional measuring method for obtaining three-dimensional information related to an image including one or a plurality of objects based on input information which describes the image. Such a method comprises the steps of (a) selecting information necessary for calculating marks of presumed information from the input information, each of the marks being used to evaluate the appropriateness of the presumed information, (b) calculating marks of each pixel of the image based on the information selected by the step (a) and based on feedback information which is derived from an internal state, the internal state including information related to the object for each pixel of the image, (c) adding the marks for each pixel calculated in the step (b) for each object so as to obtain a total mark, (d) arbitrarily changing the internal state so as to reduce the total mark, and (e) outputting the internal state in which the total mark is a local minimum as the three-dimensional information. According to the three-dimensional measuring method of the present invention, it is possible to measure three-dimensional information related to a plurality of objects with high accuracy using a single camera which picks up the objects and produces the input information.

Still another object of the present invention is to provide a three-dimensional measuring system for obtaining three-dimensional information related to an image including one or a plurality of objects based on input information which describes the image, comprising selecting means for selecting information necessary for calculating marks of presumed information from the input information, each of the marks being used to evaluate the appropriateness of the presumed information, storing means, coupled to the selecting means, for storing an internal state, the internal state including information related to the object for each pixel of the image, calculating means, coupled to the selecting means and the storing means, for calculating marks of each pixel of the image based on the information selected by the selecting means and based on feedback information which is derived from an internal state, adding means, coupled to the calculating means, for adding the marks for each pixel calculated in the calculating means for each object so as to obtain a total mark, changing means, coupled to the adding means and the storing means, for arbitrarily changing the internal state stored in the storing means so as to reduce the total mark, and output means, coupled to the storing means, for outputting the internal state in which the total mark is a local minimum as the three-dimensional information. According to the three-dimensional measuring system of the present invention, it is possible to measure three-dimensional information related to a plurality of objects with high accuracy using a single camera which picks up the objects and produces the input information.

Other objects and further features of the present invention will be apparent from the following detailed description when read in conjunction with the accompanying drawings.

BRIEF DESCRIPTION OF THE DRAWINGS

FIGS. 2(a)–2(c) are diagrams which depict the operation of the first embodiment of the method provided by the present invention;

DESCRIPTION OF THE PREFERRED EMBODIMENTS

Figure 1:
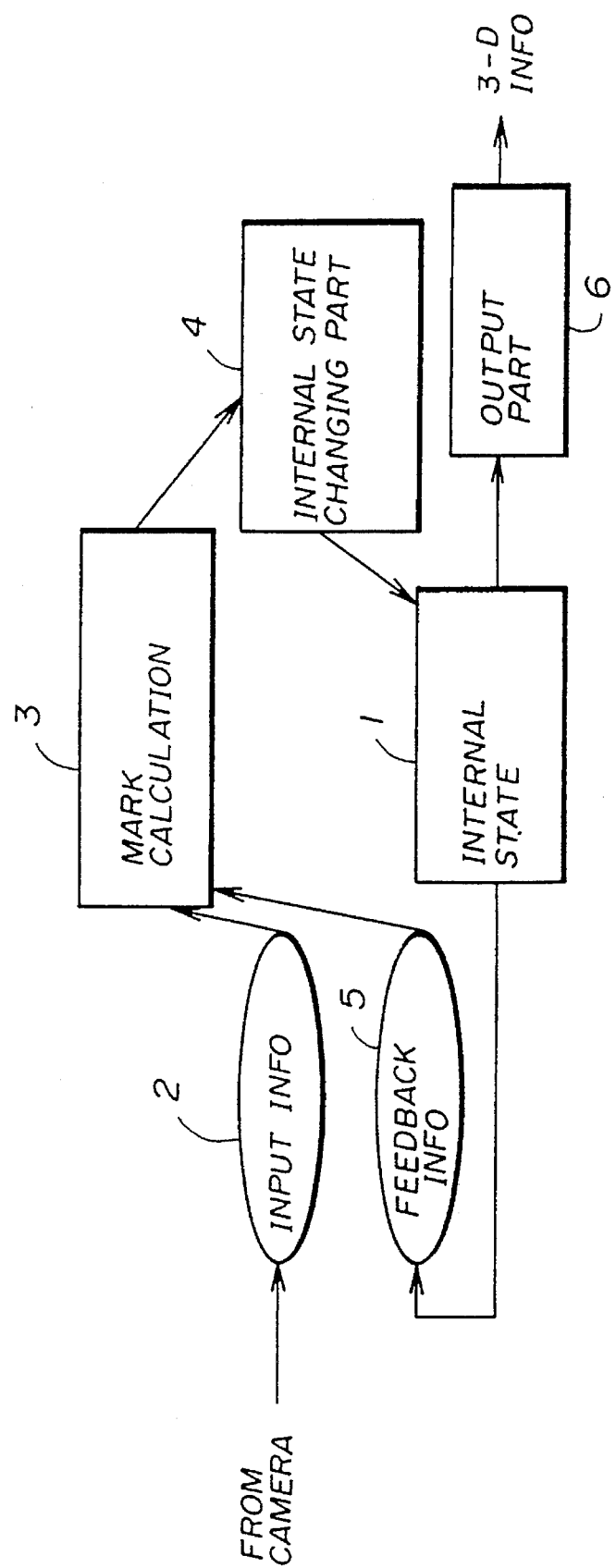
FIG. 1 is a system block diagram which depicts a first embodiment of a three-dimensional measuring method according to the present invention.

First, a description will be given of a first embodiment of a three-dimensional measuring method according to the present invention, by referring to FIG. 1. In FIG. 1, an internal state 1 includes information related to an object (or body) for each pixel of the image. The information of the internal state 1 includes information indicating the object to which each pixel belongs, information indicating the distance to the object, information indicating the manner of movement and the like. A mark calculation part 3 calculates marks or points of depth information and information which indicates continuity, based on the internal state 1 and input information 2 for each pixel obtained from the image which is received from a camera (not shown) to obtain a total mark. Each mark is used to evaluate the appropriateness of the corresponding presumed information (i.e., the degree of matching between the presumed information and the actual information related to the image). An internal state changing part 4 arbitrarily changes the internal state 1.

Mark calculation part 3 repeats the operation of obtaining the total mark, and an output part 6 outputs the internal state 1 which makes the total mark a local minimum. The output part 6 may output the internal state 1 at predetermined time intervals. The internal state 1 output from the output part 6 corresponds to three-dimensional information which is obtained by measurement.

Internal state 1 includes information indicating the object to which each pixel belongs, information indicating the distance to an object, information indicating the manner of movement and the like. On the other hand, the input information 2 for each pixel of the image received from the camera includes color information or brightness information. The distance to the object is obtained and reflected to the distance between each pixel and the object, so as to obtain a more accurate distance to the object.

Accordingly, when making the three-dimensional measurement using the single camera, it is possible to accurately measure a plurality of objects, and the accuracy further can be improved using other depth information.

Internal state 1 as described above with reference to FIG. 1, is a state which is gradually changed using input information 2 which is obtained from the camera and changes every moment. For example, internal state i includes information which is accompanied by the moving image which is made up of still images which are transmitted at a rate of 30 images per second. Hence, in this embodiment, the following information is included in the internal state 1.

(a) Information which indicates the object to which the pixel belongs, for each of the pixels of an image;

(b) A distance Z from the pixel to the object which appears in the image, for each of the pixels of an image; and (c) Information which indicates the manner of motion of the object, for each of the objects appearing in an image. The manner of motion may include translational motion (i.e., rotational motion and the like as such will be described later).

In the present invention, information (a) and information (c) are unknowns and are treated as information to be presumed.

First, appropriate values are set as initial values of the internal state 1. For example, the values in the final output (internal state 1, that is, the three-dimensional information) with respect to an immediately preceding frame may be used as the initial values of the internal state 1. Thereafter, the internal state 1 is fed back to the mark calculation part 3 as feedback information 5, so as to correct the values of the internal state 1 by the feedback values. The internal state 1 is also output via the output part 6 at predetermined intervals.

Referring now to FIGS. 2(a) and 2(c), and particularly, as shown in FIG. 2(a), an object number is assigned to each object in the image, and the information (a) of the internal state 1 is described for each object. The image is a two-dimensional arrangement of pixels having certain object numbers, and each pixel describes a position of each object on the screen.

FIG. 2(a) shows the attribute information of the objects. In this case, arbitrary object numbers (or codes) "0", "1" and "2" are assigned to the three objects appearing in the image which is picked up by the camera.

The information (b) of the internal state 1 describes the shape of the image by assigning the distance Z to the object with respect to each pixel.

The information (c) of the internal state 1 describes numerical values which are necessary to describe the motion of the object at a certain time. The motion is described by a total of 6 numerical values, including 3 components (X, Y, Z) related to the translational motion of the center of gravity for the object and 3 components (X, Y, Z) related to the rotating motion of the center of gravity of the object. As shown in FIG. 2(b), these numerical values are stored in a table for each object in correspondence with the object number.

FIG. 2(b) shows the manner of motion. In other words, the translational motion (x, y, z) of the object and the rotating motion (x, y, z) of the object are stored in the form of a table in correspondence with the object number. The translational motion indicates the translation of the object, while the rotating motion indicates the rotation of the object.

Hence, in this embodiment, the internal state 1 is described by the 3 kinds of information (a), (b) and (c) and stored.

Next, a description will be given of the input information (or feedback information 5) which is used to stabilize the internal state 1 based on the input information 2 from the camera (or the feedback information 5 from the internal state 1).

In this embodiment, the information is categorized into the following three kinds depending on the manner with which the internal state 1 is affected thereby.

(d) Information 11 which includes no depth information but indirectly describes the continuity of the depth information;

(e) Information 12 which includes no depth information but indirectly describes the discontinuity of the depth information; and (f) Information 13 which includes the depth information.

The information 11 which describes the continuity may include the following information.

(i) Information related to the hue and chroma (color saturation) of each pixel;

(ii) Information related to the luminance of each pixel; and (iii) Information related to the distribution of feature points.

The hue describes the color of the pixel, and the chroma describes the color purity. A pure color has a chroma of 100%. The luminance describes the brightness. An image which is picked up on a monochrome camera does not have hue or chroma information. The feature point distribution extracts a pixel which has a predetermined feature such as a corner.

The information 12 which describes the discontinuity may include the following information.

(iv) Information related to the distribution of pixels where the hue and chroma suddenly change spatially;

(v) Information related to the distribution of pixels where the luminance suddenly changes spatially; and (vi) Information describing the object to which each pixel belongs (feedback information 5).

The distribution of the pixels where the luminance suddenly changes is normally called an edge. The information which describes the object to which each pixel belongs is used as it is as the internal information by the same name.

The information 13 which includes the depth information may include the following information.

(vii) Information related to the distance at a specific point obtained from a contact type sensor or the like; and (viii) Information related to the distance from each pixel to the object appearing in the image (feedback information 5).

The information which is related to the distance from each pixel to the object appearing in the image is not the value of the present internal state 1, but the information by the same name obtained at the output with respect to one previous input frame (one frame of the image) is used therefor.

The information 11, 12 and 13 described above are processed according to a predetermined method so as to calculate the marks. The marks are added for all information. The internal state 1 is changed so as to minimize the total mark. Actually, it is unknown how the internal state 1 should be changed to reduce the total mark. For this reason, the present internal state 1 is arbitrarily changed by an extremely small quantity, the total mark therefor is calculated, and the internal state 1 is changed in a direction such that the calculated total mark decreases.

Next, a description will be given of the calculation of the projected motion field and the calculation of the degree of discontinuity between the adjacent pixels, which are carried out prior to the calculation of the mark.

Calculation of the projected motion field:

First, the projected motion field is calculated as a quantity which is determined from the internal state 1. The projected motion field describes the velocity (vector) which is obtained by projecting a moving object appearing in the image on an image plane for each pixel. If the object is rigid and does not change in shape, the projected motion field can be calculated from the following set of equations (1), where $\Omega=(\omega_x, \omega_y, \omega_z)$ indicates the rotating motion of the center of gravity, $T=(t_x, t_y, t_z)$ indicates the translational motion of the center of gravity, Z indicates the depth distance, (u, v) indicates the projected velocity, and (x, y) indicates the coordinate value on the screen, as shown in FIG. 3.

$$u=-\omega_z xy+\omega_y(1+x^2)-\omega_z y+(t_x-t_z x)/Z$$

$$v=-\omega_x(1+y^2)+\omega_y xy+\omega_z x+(t_y-t_z y)/Z \quad (1)$$

Figure 3:
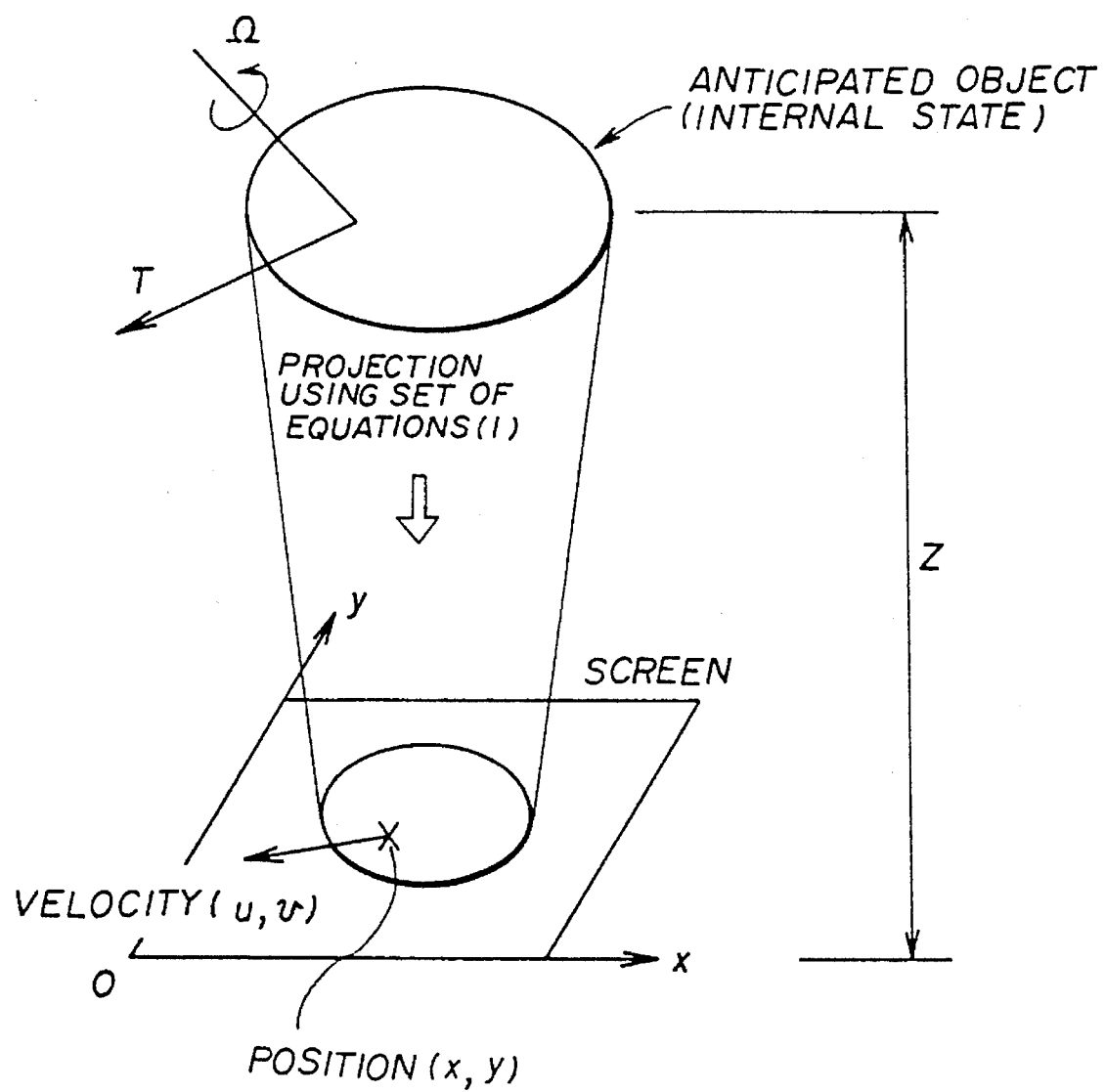
FIG. 3 is a diagram which depicts the parameters used in the first embodiment of the method.

The anticipated object is the internal state 1, and FIG. 3 shows a case where the mark is minimized based on the position (x, y) and the velocity (u, v) on the screen. The anticipated object, that is, the internal state 1, is changed by an extremely small amount so that the mark decreases, and the internal state 1 after making this change is projected on the screen using the set of equations (1) described above. The mark which is obtained from the projection is obtained repeatedly using the formula (2), so as to obtain the internal state i which makes the mark a local minimum. The internal state i which is finally obtained is output as the three-dimensional information.

For example, the method of calculating the projected motion field is described in K. Kanatani, "Understanding Image, The Mathematics of 3-Dimensional Recognition", Morikita Publishing Co., Ltd., 1990.

The calculation is made by the following method to obtain the projected velocity (u, v) for all pixels by varying (x, y) on the screen.

1. Initialization:

A present target pixel (x, y) is positioned to the origin (0, 0). In this case, it is assumed for the sake of convenience that the origin is located at the top left of the screen.

2. Object Specification:

The object to which the pixel which is designated by the present (x, y) belongs is specified.

3. Motion Retrieval:

The manner of motion is retrieved for the pixel which is designated by the present (x, y).

4. Calculation of Projected Velocity:

The velocity (u, v) which is projected by the set of equations (1) is calculated.

5. Moving Target Pixel:

The present target pixel is moved to the right by one pixel. If the present target pixel cannot be moved further to the right, the present target pixel is moved to the left end of the immediately following stage (that is, the stage immediately below). The moving of the present target pixel is ended if no more pixel exists.

6. Jump to Object Specification:

The process jumps to the object specification described under item 2 above. By repeating the above described process, the velocity (u, v) is calculated for the position (x, y) of the object which is projected on the screen.

Calculation of the Degree of Discontinuity Between Adjacent Pixels:

The degree of discontinuity between the adjacent pixels is calculated from the information (12) which describes the discontinuity. As shown in FIG. 2 (c), the total number of adjacent pixels is 8, including the pixels which are located diagonally to the center pixel and the pixels which are located above, below, to the right and left of the center pixel. In FIG. 2(c), the center pixel is indicated by a circle with a hatching, and the pixels adjacent to this center pixel are indicated by unhatched circles. When describing the continuity or discontinuity between the adjacent pixels, the evaluation is made based on the average value, as will be described later. For example, the continuity or discontinuity is evaluated depending on whether or not the color is the same or the luminance is essentially the same.

With respect to each pixel, there exists 8 adjacent pixels. Hence, in order to store the degree of discontinuity between the adjacent pixels, it is sufficient to prepare a maximum of 8 images. In this embodiment, the degrees of discontinuity of the 8 adjacent pixels are averaged and stored in one image. In other words, the image in which each pixel is made to correspond to the degree of discontinuity between the pixel and its adjacent pixel is calculated and formed. The calculation of the degree of discontinuity may be made according to the following procedure.

1. Initialization:

A present target pixel (x, y) is positioned to the origin (0, 0). In this case, it is assumed for the sake of convenience that the origin is located at the top left of the screen.

2. Selection of Adjacent Pixel:

One pixel (x', y') which is adjacent to the present target pixel is selected.

3. Calculation of the Degree of Discontinuity With Respect to Each Information 12:

The degree of discontinuity between a pair of pixels (x, y) and (x', y') is calculated for each information 12, and the marks are added.

4. Calculation for Different Adjacent Pixel:

The calculation of the degree of discontinuity with respect to each information 12 is made again by changing the adjacent pixel.

5. Moving Target Pixel:

The present target pixel is moved to the right by one pixel. If the present target pixel cannot be moved further to the right, the present target pixel is moved to the left end of the immediately following stage (that is, the stage immediately below). The moving of the present target pixel is ended if no more pixel exists.

6. Jump to Selection of Adjacent Pixel:

The process jumps to the selection of the adjacent pixel described under item 2 above.

The degree of discontinuity between the pair of pixels (x, y) and (x', y') with respect to the information 12 is calculated in the following manner.

That is, if the two pixels (points) include a point where the value of the information 12 suddenly changes or, the value of the information 12 changes between the two points, the degree of discontinuity is set to "1". Otherwise, the degree of discontinuity is set to "0".

Next, a description will be given of the calculation of the mark for the information 11 which describes the continuity, by using the degree of continuity between the adjacent pixels.

The mark is calculated with respect to the information 11 which describes the continuity, according to the following procedure.

1. Initialization:

A counter which counts the mark is initialized to "0", and the target pixel is placed to the origin.

2. Calculation of Mark:

The mark at the pixel (x, y) is calculated and added to the value of the counter.

3. Moving Target Pixel:

The present target pixel is moved to the right by one pixel. If the present target pixel cannot be moved further to the right, the present target pixel is moved to the left end of the immediately following stage (that is, the stage immediately below). The moving of the present target pixel is ended if no more pixel exists.

4. Jump to Calculation of Mark:

The process jumps to the calculation of the mark described under item 2 above.

For example, the mark of the information 11 at the pixel (x, y) is calculated by the following formula (2). In this case, it is assumed for the sake of convenience that the information 11 is a function which determines one value with respect to each pixel of each frame of the moving image, and the value of the information 11 at a time t for the pixel (x, y) is denoted by F(x, y; t).

$$|(F(x+1, y; t) - F(x, y; t))*u + (F(x, y+1; t) - F(x, y; t))*v + (F(x, y; t) - F(x, y; t-1))|* [(\text{Maximum of Degree of Discontinuity}) - (\text{Degree of Discontinuity at } (x, y))] \quad (2)$$

In the formula (2), the velocity (u, v) indicates the projected velocity (flow) at the position (x, y), and the terms between the absolute value signs become "0" if the distribution of the information 11 moves at a velocity (u, v) which is projected from the distribution at a previous time (t−1). Accordingly, if the velocity (u, v) describes the correctly projected velocity, the value obtained from the formula (2) becomes sufficiently small. For example, the degrees of discontinuity with respect to all of the information 12 are added and used as the degree of discontinuity at the position (x, y) appearing in the formula (2).

Next, a description will be given of the method of calculating the mark with respect to the information 13 which describes the depth information.

The mark may be calculated in the following manner with respect to the information 13.

1. Initialization:

The counter which counts the mark is initialized to "0". In addition, the target pixel is placed to the origin.

2. Calculation of Mark:

The mark at the pixel (x, y) is calculated and added to the value of the counter.

3. Moving Target Pixel:

The present target pixel is moved to the right by one pixel. If the present target pixel cannot be moved further to the right, the present target pixel is moved to the left end of the immediately following stage (that is, the stage immediately below). The moving of the present target pixel is ended if no more pixel exists.

4. Jump to Calculation of Mark:

The process jumps to the calculation of the mark described under item 2 above.

For example, the mark of the information 13 at the pixel (x, y) is calculated by the following formula (3), where G(x, y) denotes the information 13 at the position (x, y).

$$|G(x, y) - (\text{Distance to the Object at } (x, Y))|* [\text{Reliability of Information 13 at } (x, y)] \quad (3)$$

The distance to the object at the position (x, y) is the present value of the internal state 1. In addition, the reliability of the information 13 is a numerical value which indicates how reliable the information 13 is. The distance information at a specific point obtained from the contact type sensor or the like has a positive reliability only at the specific point, and the reliability is "0" at virtually all other points.

The marks of each of the pixels are obtained and the total mark for each object is calculated in the above described manner. Based on the total mark, the internal state 1 is changed so that the total mark becomes a local minimum. The internal state 1 which makes the total mark a local minimum is output as the three-dimensional information related to the object. The three-dimensional information includes the information (a) which indicates the object to which the pixel belongs for each of the pixels, the information (b) which indicates the distance Z from the pixel to the object which appears in the image for each of the pixels and the information (c) which indicates the manner of motion of the object for each of the objects appearing in the image.

Figure 4:
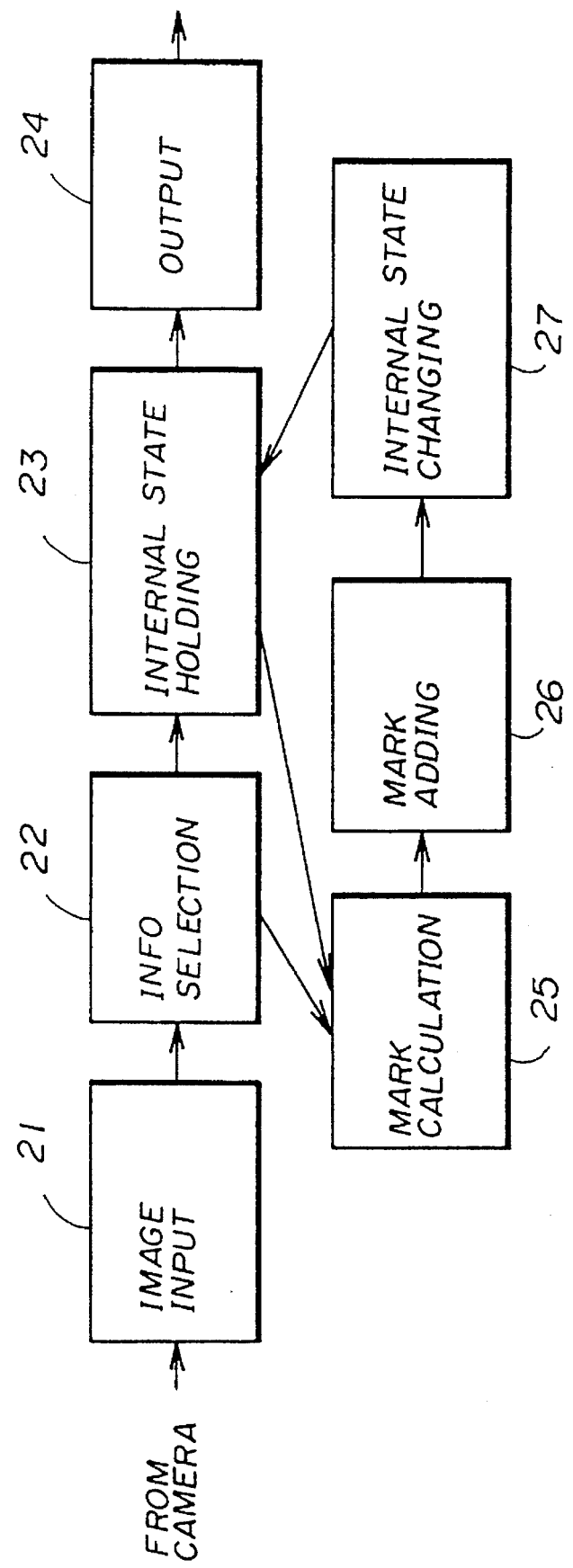
FIG. 4 is a system block diagram which depicts a first embodiment of a three-dimensional measuring system according to the present invention.
Figure 5:
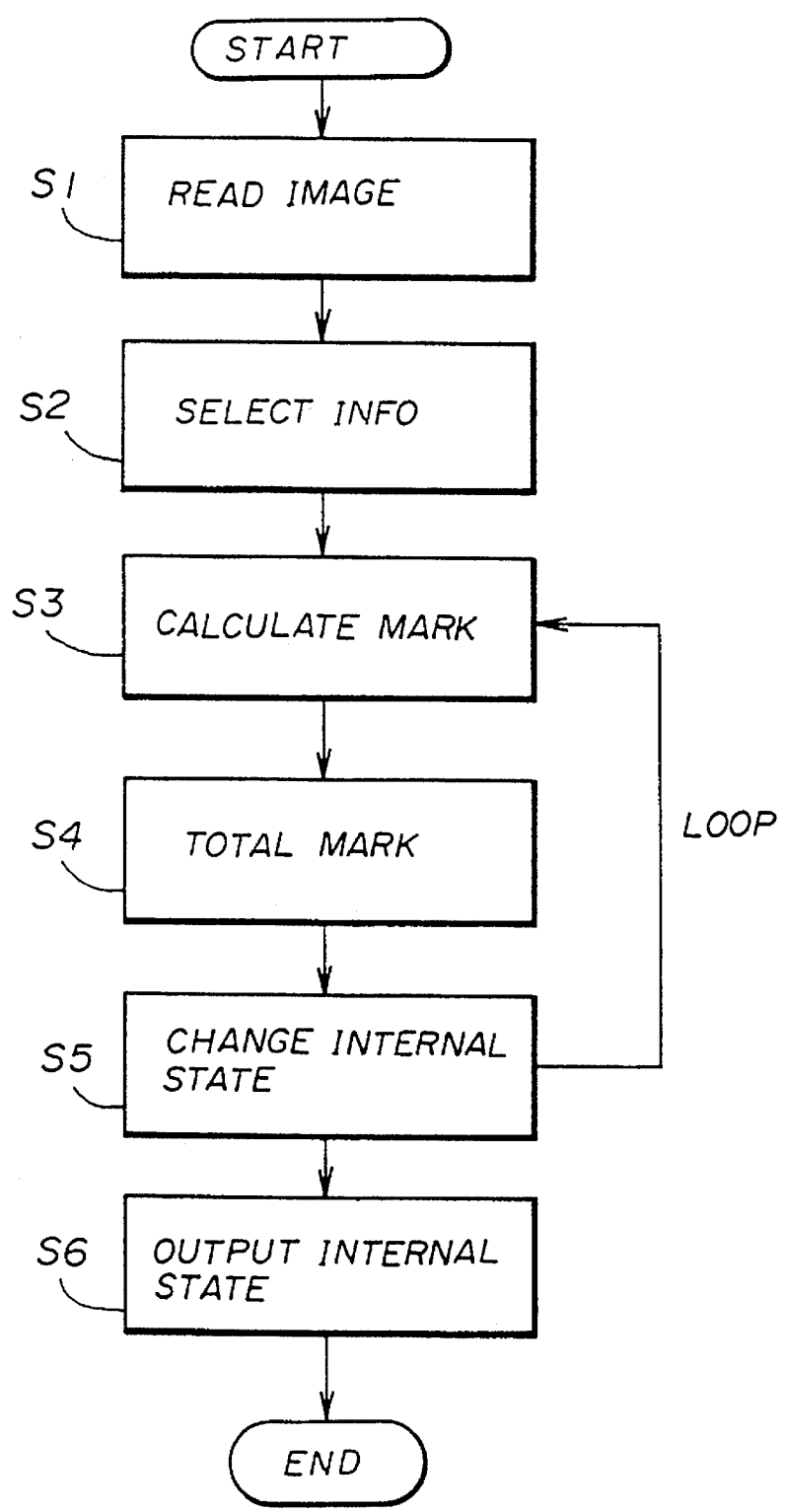
FIG. 5 is a flow chart which illustrates the operation of the first embodiment of the system shown in FIG. 4.

Next, a description will be given of an embodiment of a three-dimensional measuring system according to the present invention, by referring to FIGS. 4 and 5. FIG. 4 is a system block diagram showing an embodiment of the system and FIG. 5 is a flow chart for explaining the operation of the embodiment shown in FIG. 4.

In FIG. 4, an image input part 21 stores the input image (input information 2) which is received from a camera (not shown). An information selection part 22 selects the information 11 which describes the continuity, the information 12 which describes the discontinuity and the information 13 which describes the depth information, from the input image which is stored in the image input part 21. An internal state holding part 23 holds the internal state 1 (three-dimensional information) of the object to be calculated. An output part 24 receives the internal state 1 which is held by the internal state holding part 23 and in which the mark is a local minimum or, the internal state 1 which is received at predetermined time intervals, and outputs the internal state 1 as the result of the calculation (three-dimensional information). The output from output part 24 can be used by a control unit to control the operation of a robotic device (e.g., a robot eye or arm as suggested above in the background section of this patent document).

A mark calculation part 25 calculates the mark based on the input information which is selected from the information stored in the image input part 21 and based on the feedback information 5 which is calculated from the internal state 1 which is held by the internal state holding part 23. For example, the calculation of the mark is made as in the case of the mark related to the information 11 or the mark related to the information described above.

A mark adding part 26 adds the marks calculated in the mark calculation part 25, so as to obtain a total mark for each object. An internal state changing part 27 arbitrarily changes the internal state 1 so that the mark decreases. The calculation is made again in the mark calculation part 25 based on the changed internal state 1, and the internal state 1 having the smaller total mark is output via the output part 24 as the three-dimensional information related to the object calculated from the input information 2 which is picked up by the camera. As described above, it is possible to further improve the accuracy by reflecting the depth information which is measured according to other techniques.

Next, a description will be given of the operation of this embodiment of the system shown in FIG. 4, by referring to FIG. 5.

In FIG. 5, a step S1 reads the image. This step S1 is realized by the image input part 21 which reads the image (input information 2) of the object picked up by the camera.

A step S2 selects the information. Step S2 is realized by the information selection part 22 which selects the information which is necessary to calculate a mark from the image (input information 2) read by the information selection part 22 in the step S1. The information such as the information 12 which describes the discontinuity and the information 13 which describes the depth information is selected based on the information such as the color and luminance information.

A step S3 calculates a mark. Step S3 is realized by the mark calculation part 25 which calculates the mark for each pixel based on the input information 2 which is selected by the information selection part 22 in the step S2 and based on the feedback information 5 which is obtained from the internal state 1 held in the internal state holding part 23.

A step S4 obtains the total of the marks. Step S4 is realized by the mark adding part 26 which adds the marks obtained in the step S3 for each pixel and obtains the total mark for each object, for example.

A step S5 changes the internal state 1. Step S5 is realized by the internal state changing part 27 which changes the internal state 1 and returns to the step S3 so as to repeat the process of calculating the mark.

A step S6 outputs the internal state 1 having the smaller mark. Step S6 is realized by the output part 24.

Therefore, in this embodiment of the system, the mark is calculated based on the input information 2 which is picked up by the camera and also is based on the feedback information 5 which is obtained from the internal state. This calculation of a mark is repeated by successively changing the internal state 1 by extremely small amounts in a direction such that the mark decreases. The internal state 1 with the minimum mark or the mark which corresponds to the local minimum is output as the three-dimensional information of the object to be obtained. As a result, it is possible to generate and output the three-dimensional information based on two-dimensional (planar) information output from the camera or the like. As described above, the depth information of the object may be obtained independently and reflected to the internal state 1 by using the formula (3), so that a more accurate internal state 1 is generated and output as the three-dimensional information.

Figure 6:
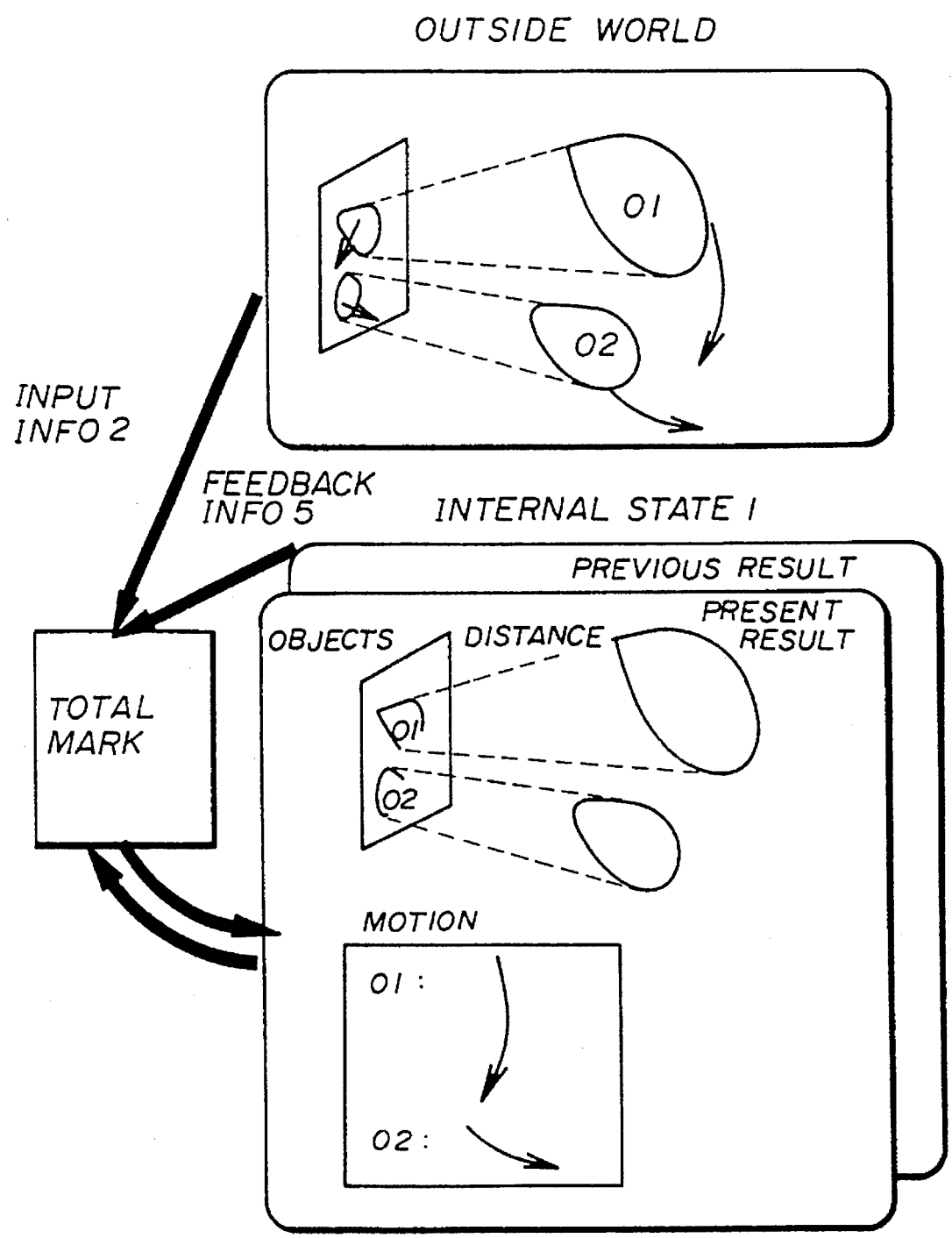
FIG. 6 is a diagram which depicts the general operation of the present invention.

FIG. 6 is a diagram for explaining the general operation of the present invention. In FIG. 6, the outside world includes objects O1 and O2, and these objects O1 and O2 are picked up by a camera, for example. The camera picks up the image of the actual objects O1 and O2 which move in respective directions indicated by arrows. The image information obtained by the camera is used as the input information 2.

On the other hand, the internal state 1 is the assumption made of the outside world. In this case, the internal state 1 includes the distances to each of the objects O1 and O2, and the manners of motion of each of the objects O1 and O2. The internal state 1 which is previously obtained is fed back as the feedback information 5, and the total mark is calculated based on the input information 2 and the feedback information.

In addition, the internal state 1 is output as the three-dimensional information. Furthermore, the internal state 1 is changed so that the total mark becomes a local minimum, and the changed internal state 1 is then output as the three-dimensional information. As a result, the three-dimensional information which is output, that is, the presumed information related to the outside world, gradually approaches the actual information related to the outside world.

Further, the present invention is not limited to above-described embodiments, but various variations and modifications may be made without departing from the scope of the present invention.

What is claimed is:

1. A three-dimensional measuring method adapted for obtaining three-dimensional information related to an image including at least one object based on input information which describes the image, said three-dimensional measuring method adapted to be utilized during control operations of a robotic device, said image comprising a plurality of pixels, said three-dimensional measuring method comprising the steps of:

(a) selecting information necessary for calculating mark values of presumed information from the input information, each of said mark values being used to evaluate the appropriateness of the presumed information, said presumed information modeling said image;

(b) calculating mark values corresponding to each pixel of the image based on the information selected by said step (a) and based on feedback information related to said presumed information which is derived from an internal state, said internal state including information related to the object corresponding to each pixel of the image;

(c) adding the mark values for each pixel calculated in said step (b) for each object so as to obtain a total mark value;

(d) arbitrarily changing the internal state so as to reduce the total mark value;

(e) outputting the internal state in which the total mark value is a local minimum as the three-dimensional information; and (f) controlling movement of a robotic device based on the internal state output during said outputting step (e).

2. The three-dimensional measuring method as claimed in claim 1, wherein the internal state includes information indicating the object to which each pixel of said image belongs, information indicating the distance to the object, and information indicating the manner of movement of each pixel of said image.

3. The three-dimensional measuring method as claimed in claim 2, wherein the information indicating the object to which each pixel belongs and the information indicating the manner of movement of each pixel are treated as unknown values.

4. The three-dimensional measuring method as claimed in claim 1, wherein said presumed information includes first information which describes continuity of depth of each object, and second information which describes the depth of each object of said at least on object.

5. The three-dimensional measuring method as claimed in claim 4, wherein said first information includes at least one information selected from a group consisting of hue information related to each pixel, chroma information related to each pixel, luminance information related to each pixel, and feature point distribution related to a distribution of feature points said image.

6. The three-dimensional measuring method as claimed in claim 4, wherein said presumed information further includes third information which describes discontinuity of the depth of each object of said at least one object.

7. The three-dimensional measuring method as claimed in claim 6, wherein the third information includes at least one information selected from a group consisting of information related to a distribution of pixels where hue and chroma suddenly change spatially, information related to a distribution of pixels where luminance suddenly changes spatially, and the feedback information describing the object to which each pixel belongs.

8. The three-dimensional measuring method as claimed in claim 1, wherein the input information includes color and brightness information related to the image.

9. The three-dimensional measuring method as claimed in claim 1, which further comprises the step of:

(f) obtaining the distance to the object and reflecting this distance to a distance between each pixel to the object.

10. The three-dimensional measuring method as claimed in claim 1, wherein the input information is received from a single camera which picks up said image of said scene.

11. A three-dimensional measuring system for obtaining three-dimensional information related to an image of a scene including one or a plurality of objects based on input information which describes the image, said three-dimensional measuring system adapted to control movement of a robotic device, said three-dimensional measuring system comprising:

selecting means for selecting information necessary for calculating mark values of presumed information from the input information, each of said mark values being used to evaluate the appropriateness of the presumed information, said presumed information modeling said scene;

storing means coupled to said selecting means, for storing an internal state of said the three-dimensional measuring system, said internal state including information related to the object for each pixel of the image;

calculating means coupled to said selecting means and to said storing means, for calculating mark values of each pixel of the image based on the information selected by said selecting means and based on feedback information related to said presumed information which is derived from an internal state;

adding means coupled to said calculating means for adding the mark values for each pixel calculated by said calculating means for each object so as to obtain a total mark value;

changing means coupled to said adding means and to said storing means for arbitrarily changing the internal state stored in said storing means so as to reduce the total mark value;

output means, coupled to said storing means, for outputting the internal state in which the total mark value is a local minimum as the three-dimensional information; and a control unit configured to control said robotic device based on said internal state as output by said output means.

12. The three-dimensional measuring system as claimed in claim 11, wherein the internal state includes information indicating the object to which each pixel belongs, information indicating the distance to the object, and information indicating the manner of movement of each pixel.

13. The three-dimensional measuring system as claimed in claim 12, wherein the information indicating the object to which each pixel belongs and the information indicating the manner of movement of each pixel are treated as unknowns.

14. The three-dimensional measuring system as claimed in claim 11, wherein the presumed information includes first information which describes continuity of depth of each object, and second information which describes the depth of each object.

15. The three-dimensional measuring system as claimed in claim 14, wherein the first information includes at least one information selected from a group consisting of hue information related to each pixel, chroma information related to each pixel, luminance information related to each pixel, and feature point distribution related to a distribution of feature points in the image.

16. The three-dimensional measuring system as claimed in claim 14, wherein the presumed information further includes third information which describes discontinuity of the depth of each object.

17. The three-dimensional measuring system as claimed in claim 16, wherein the third information includes at least one information selected from a group consisting of information related to a distribution of pixels where hue and chroma suddenly change spatially, information related to a distribution of pixels where luminance suddenly changes spatially, and the feedback information describing the object to which each pixel belongs.

18. The three-dimensional measuring system as claimed in claim 11, wherein the input information includes color or brightness information related to the image.

19. The three-dimensional measuring system as claimed in claim 11, which further comprises means for obtaining the distance to the object and reflecting this distance to a distance between each pixel to the object.

20. The three-dimensional measuring system as claimed in claim 11, which further comprises a single camera for picking up the objects and producing the input information.

* * * * *

UNITED STATES PATENT AND TRADEMARK OFFICE
CERTIFICATE OF CORRECTION

PATENT NO. : 5,502,657

DATED : March 26, 1996

INVENTOR(S) : Endoh

It is certified that error appears in the above-indentified patent and that said Letters Patent is hereby corrected as shown below:

Col. 1, line 47, "that and" should be --and that--.

Col. 3, line 56, "state i" should be --state 1--.

Col. 6, lines 8 and 9, "state i" should be --state 1--.

Col. 7, line 57, "pixel exists." should be --pixels exist--.

Col. 8, line 41, "(x, Y)" should be --(x, y)--.

Col. 11, line 31, "on" should be --one--.

Signed and Sealed this

Sixth Day of August, 1996

Attest:

BRUCE LEHMAN

*Attesting Officer*   *Commissioner of Patents and Trademarks*